H. C. CRUMRINE.
SIGNALING MECHANISM.
APPLICATION FILED JULY 5, 1912.
1,106,441.
Patented Aug. 11, 1914.
3 SHEETS—SHEET 2.
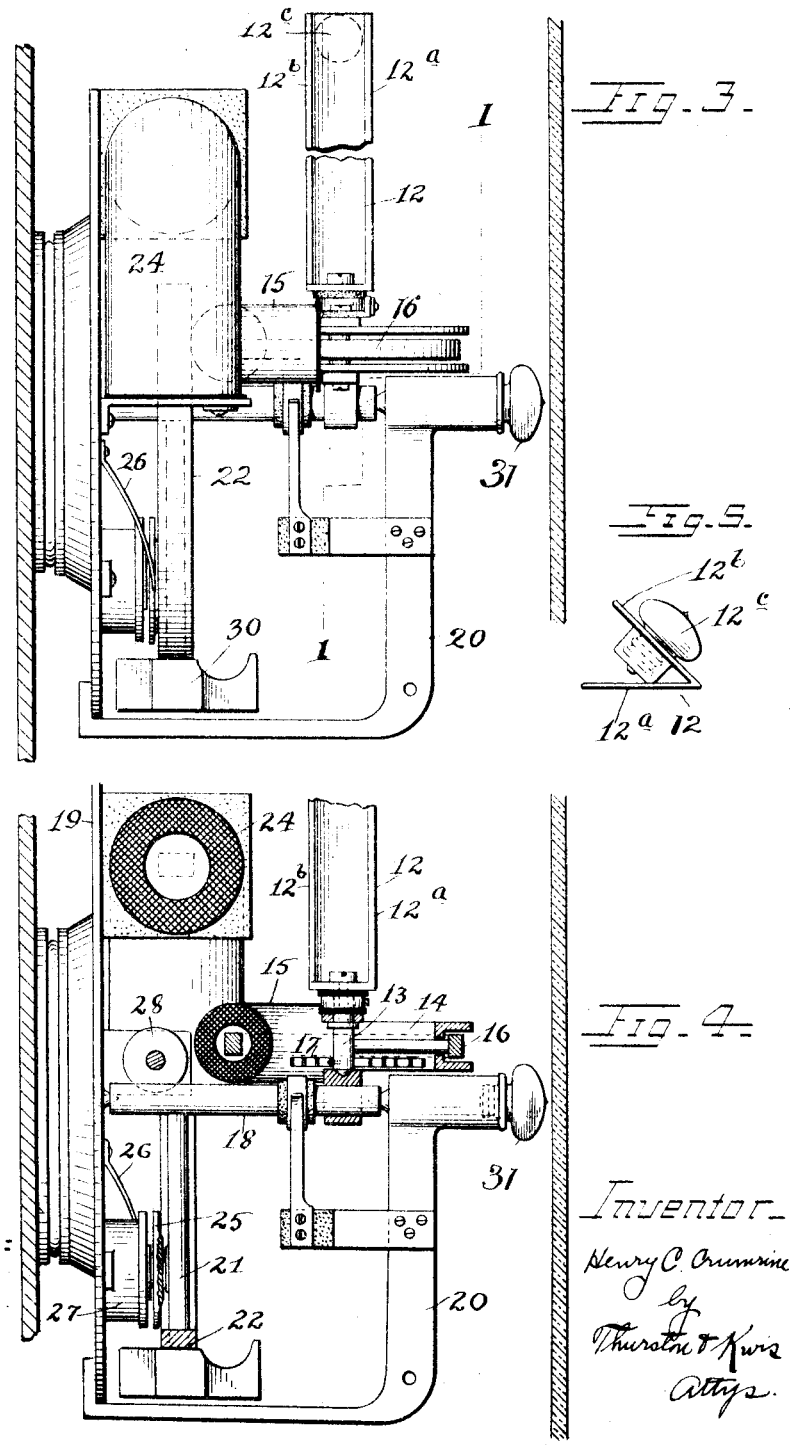

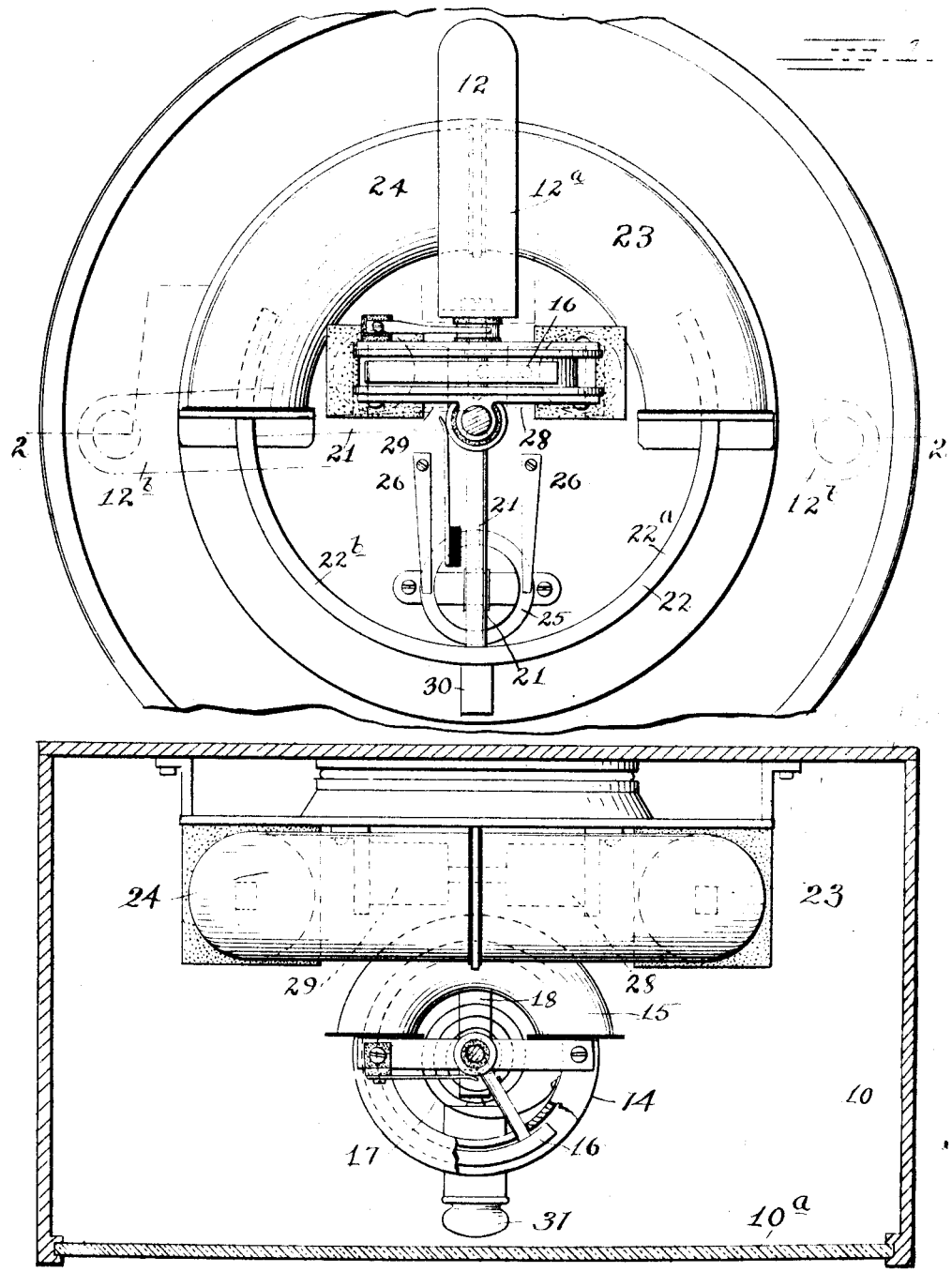

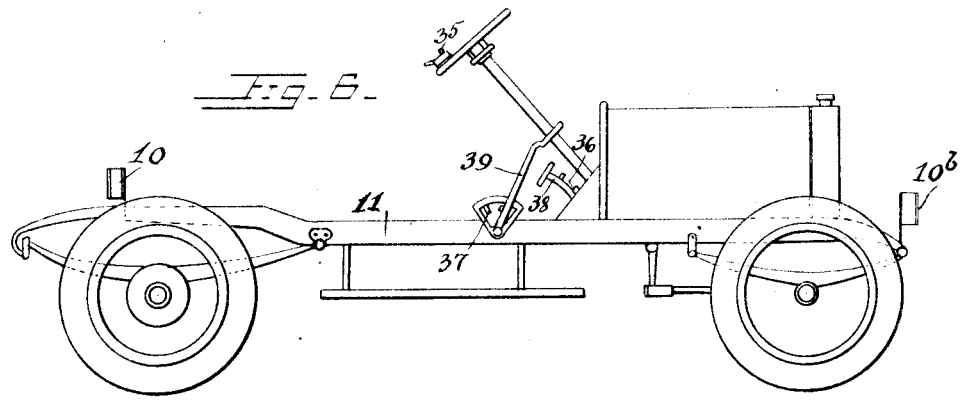
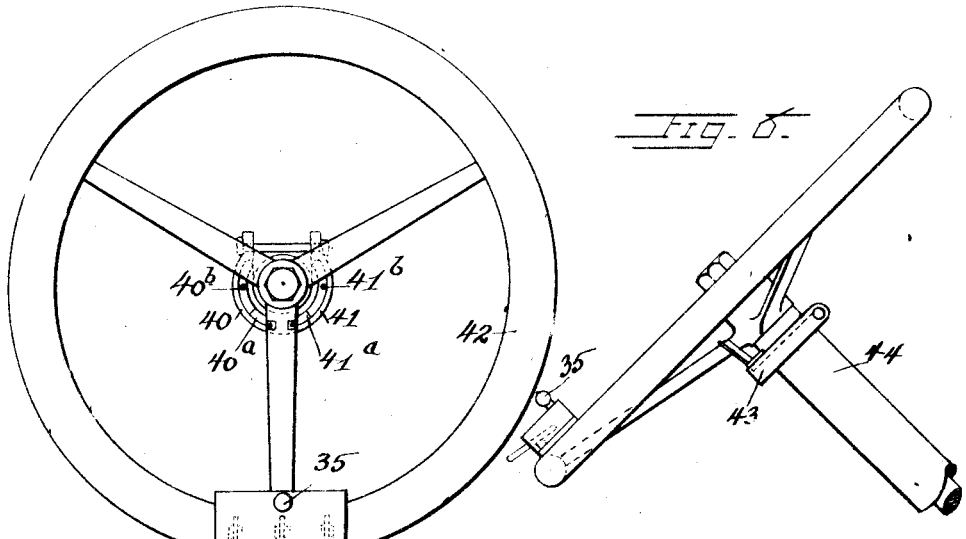
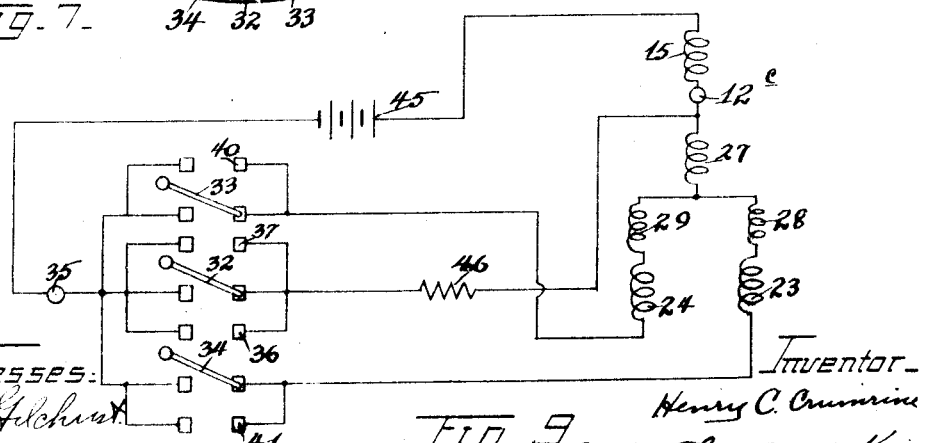

UNITED STATES PATENT OFFICE.

HENRY C. CRUMRINE, OF CLEVELAND, OHIO.

SIGNALING MECHANISM.

1,106,441.  Specification of Letters Patent.  Patented Aug. 11, 1914.

Application filed July 5, 1912. Serial No. 707,679.

*To all whom it may concern:*

Be it known that I, HENRY C. CRUMRINE, a citizen of the United States, residing at Cleveland, in the county of Cuyahoga and State of Ohio, have invented a certain new and useful Improvement in Signaling Mechanism, of which the following is a full, clear, and exact description.

This invention relates to signaling mechanisms adapted especially for use on vehicles to give notice of the fact that the vehicle is about to stop or to turn either to the right or to the left.

My invention contemplates the use of a signaling device, preferably a visual signal designed to be actuated manually, or automatically through the instrumentality of any of the operating parts which are normally employed in bringing the vehicle to a stop, or in guiding or turning the vehicle.

In the preferred embodiment of my invention, the signal includes an arm, a lamp, and a suitable electric or electro-magnetic mechanism which, to indicate that the vehicle is about to stop, causes the arm to be turned to expose the lamp, and simultaneously causes the lamp to be lighted, and to indicate that the vehicle is to turn either to the right or to the left, causes the arm to be turned so as to expose the lamp to the rear, and simultaneously swings the arm in a vertical plane, either to the right or to the left, depending upon whether the vehicle is to turn to the right or to the left.

The signaling mechanism, as at present constructed, includes the above and numerous other features which coöperate with those specifically mentioned above, and my invention may be here briefly summarized as consisting in certain novel details of construction and combinations and arrangements of parts which will be described in the specification and set forth in the appended claims.

In the accompanying drawings, wherein I have shown one embodiment of my invention. Figure 1 is a rear view of the signal and of the main parts which actuate it, parts being broken away, and parts being shown in section substantially along the line 1—1 of Fig. 3; Fig. 2 is a horizontal sectional view substantially along the line 2—2 of Fig. 1, portions being broken away; Fig. 3 is a side view with the casing in section; Fig. 4 is a central vertical sectional view with parts broken away; Fig. 5 is a section through the signaling arm, showing the lamp carried by the arm; Fig. 6 is a side view of a portion of the motor vehicle, and illustrates the arrangement and manner of operating the signal; Fig. 7 is a top plan view of the steering wheel of the car, showing part of the manual and automatic switching devices; Fig. 8 is a side view of the same; and Fig. 9 is a diagram illustrating in simplified form, the various electrical connections.

The main parts of the signal are preferably inclosed within a suitable casing 10 which may be supported in any desired manner, depending on the particular use for which the signal is intended. It may be employed on a motor car such as shown at 11, and is preferably supported at the rear end of the vehicle, as shown in Fig. 6, so that the signal proper can be readily seen by the driver of the car following, the casing being then preferably provided with a transparent rear face $10^a$. The signal includes an arm 12 which normally stands in upright or vertical position, as shown in Fig. 1. The arm which is designed to be turned, as hereinafter described, preferably has a plain or white rear side $12^a$, and a red side or face $12^b$, which is normally hidden from view from the rear. This side $12^b$ also carries a signaling lamp $12^c$, which normally is extinguished and is not visible from the rear. This lamp is preferably an incandescent electric lamp with a red globe. The arm 12 is secured to a normally vertical pin 13 which is swiveled for movement about its axis in suitable cross members of a circular frame 14 which carries an arc shaped turning magnet 15. The pin 13 is provided with a laterally extending arm having at its outer end an arc-shaped armature 16 which is adapted to travel in a groove of the circular frame 14 and to move into and out of the magnet 15. A suitable spring 17, here shown as a spiral spring having one end connected to the circular track or frame 14 and its other end to the swiveled pin 13, holds the arm in its normal position, with its white face rearward, and with the lamp hidden from the rear, but when the magnet 15 is energized, the armature is swung into the confines of the coil so as to turn the arm a sufficient distance to bring the face $12^b$ and the lamp $12^c$ to the rear. Thence, when the magnet is deënergized, the spring will turn the arm to its normal position. The frame 14 and parts carried thereby, including the arm 12 and magnet 15 are supported for turning movement about a horizontal axis upon a horizontal swiveled pin or spindle 18, the forward end of which has a swiveled connection with the base plate 19, and the rear end of which has a swiveled connection with an upwardly extending part of a bracket 20. This horizontal pin 18 has projecting at right angles from it. an arm 21 which is normally vertical and which carries an arc-shaped armature 22, portions of which extend equal distances on opposite sides of the arm 21, and constitute in effect two separate armatures 22$^a$ and 22$^b$. These two armatures coöperate with two swinging magnets or magnet coils 23 and 24 which are designed to swing the arm 12 to the left and right respectively. As the apparatus is viewed from the rear, or as shown in Fig. 1, the arm will swing to the left so as to indicate that the car is to turn to the left, when the magnet 23 is energized, and the arm will swing to the right to indicate that the car is to turn to the right, when the magnet 24 is energized. As will be explained presently, when either of the swinging magnets 23 or 24 is energized, the turning magnet 15 is energized to simultaneously turn the arm about its own axis to expose the signal lamp and signaling side of the arm.

To hold the arm 12 normally in upright position and to prevent the same from swinging due to the vibration and jolting of the car, a locking and releasing means is provided, including a locking disk 25, which normally interlocks with the lower part of the depending arm 21, and is yieldingly supported from the base plate 19 by a pair of springs 26. This disk is adapted to be retracted from the arm 21 so as to release the arm 21 and the signaling mechanism by means of a releasing magnet 27 supported on the lower part of the base plate 19 in proximity to the disk or armature 25. As will be explained presently, when either of the swinging magnets 23 or 24 is energized, this magnet 27 is likewise energized to permit the mechanism to be swung as above described.

The arm 12 is designed to be swung through an arc of substantially 90° either to the right or to the left so that when it is in position to indicate the turning of the car, it is substantially horizontal. To hold the arm in its horizontal position and to prevent it from swinging up and down when it is indicating the direction in which the car is being turned or is about to turn, I provide two holding magnets 28 and 29,—see Figs. 2 and 4. These two magnets are supported from the base plate 19 under the swinging magnets 23 and 24, and behind the turning magnet 15. The magnet 28 is energized when the swinging magnet 23 is energized to swing the arm 12 to the left, as viewed in Fig. 1, and this magnet thence holds the arm 12 in its horizontal position when swung to the left by reason of the fact that the depending arm 21 engages, and is attracted to the tip or pole of this magnet, this arm 21, of course, swinging to the right when the arm 12 swings to the left. In a similar manner, the magnet 29 holds the arm 12 horizontally when the arm is swung to the right. Of course, when the magnets 28 and 29 are deënergized, the arm 21 is released, so as to permit the arm 12 to return to normal upright position. The arm 12 is preferably swung to normal position by means of a weight 30 which, when the arm is released, always swings downward to its lower central position, or to a point where the arm 21 will be caused to interlock with the holding device 25. At the free end of the bracket 20, I provide a lamp 31 which serves as a tail lamp. This lamp is controlled independently of the signaling mechanism by a separate switch, not here shown. Thus, it will be seen that the signal includes in its operating mechanism, a turning magnet 15 which is energized when the signaling arm is to be merely turned on its axis to indicate the stopping of the car; two swinging magnets 23 and 24 which are designed to be energized when the arm is to be swung to the left, and the right respectively; a releasing magnet 27, which is energized when either of the swinging magnets is energized; and two holding magnets, one of which is energized when the releasing magnet and one of the swinging magnets are energized, and the other of which is energized when the second swinging magnet is energized, so as to hold the arm temporarily in horizontal position, or until the holding, swinging, and releasing magnets are deënergized.

Having now described the principal parts of the signal proper, I will explain the preferred manner of causing the energization of the operating magnets.

As before stated, the signal may be operated either manually or automatically. I prefer to provide means on the car (assuming that the signal is installed on a car) by which the signal may be operated both manually and automatically. In other words, I wish to provide manually operable switches within convenient reach of the operator, and also to provide switches which are actuated automatically, one or more, by mechanism which brings the car to a stop, and two operated by the steering mechanism when the car is being turned to the right and to the left respectively. I also prefer to employ in association with these switches and electrically connected thereto, a lamp which is in position to be readily seen by the operator so that he will be constantly informed of the condition of the signal mechanism,—that is, will know whether it is operating or in proper operative condition. It also serves to remind the driver that the brakes are set, and minimizes the liability of the driver attempting to start the car with the brakes set.

For the manual control of the signal, I prefer to provide three switches 32, 33, and 34, which may be placed directly upon the steering wheel, as shown conventionally in Figs. 6, 7 and 8. The middle switch may be utilized for operating the turning magnet to indicate that the car is to be stopped or slowed down, and the switches 33 and 34 may be utilized to cause the energization of the swinging magnets 24 and 23, when the car is to turn to the right and to the left respectively. In close association with these switches, and preferably on the steering wheel, I also provide a lamp 35, which is to be lighted whenever the signal is operated, so that the operator will know that the signal is in operative condition or has been operated. The lamp 35 may be called the indicating lamp to distinguish from the lamp 12$^c$ which may be aptly called the signaling lamp.

To automatically operate the stopping signal, I provide a pair of switches 36 and 37, one in association with the brake pedal 38, and the other in association with the emergency brake lever 39. The switch 36 includes a stationary contact and a contact carried by the brake pedal and adapted to be brought into engagement with said stationary contact. The switch 37 includes a stationary contact and a second contact carried by the emergency brake lever, and adapted to be brought into engagement with the stationary contact.

For automatically operating the signal to indicate that the car is to be turned, or is being turned to the right or to the left, I provide on the steering mechanism, two switches 40 and 41. These two switches include a pair of insulated or separate contacts 40$^a$, 41$^a$, carried by an arm of the steering wheel 42, and a pair of relatively stationary contacts 40$^b$ and 41$^b$, carried by a suitable member 43 clamped about the steering post 44.

By reference to Fig. 9, wherein a simplified arrangement of wiring connections are shown, it will be seen that when the hand switch 32 is operated or when either of the automatic switches 36 or 37 is operated, the circuit is completed through the battery 45, turning magnet 15, signaling lamp 12$^c$ and indicating lamp 35. I prefer also to include in this circuit a resistance 46 of suitable ohmic value. When any one of these three switches is operated, the signal arm will be turned about its own axis, and the signaling lamp will be lighted. It will be seen also that when the hand switch 33 is closed by the operator, or when the switch 40 is closed by turning the steering wheel to turn to the right swinging magnet 24, holding magnet 29, releasing magnet 27, and turning magnet 15 are energized, and at the same time the signaling lamp 12$^c$ is lighted, as is of course also the indicating lamp 35. The magnets 15, 24, 27 and 29 are thence all connected in series, and no resistance need be provided for this circuit. It will be seen also that when the hand switch 34 is closed by the operator, or when switch 41 is closed, by turning the steering wheel in a counter clockwise direction, as viewed in Fig. 7, to cause the car to be turned to the left, the circuit is completed through the swinging magnet 23, holding magnet 28, releasing magnet 27, turning magnet 15, signaling lamp 12$^c$, and indicating lamp 35, all these magnets and lamps being connected in series with the battery, and causing the signal to be operated to indicate that the car is to turn to the left.

While the signaling mechanism may be and is preferably arranged at the rear of the vehicle, as a rear end signal, it can be used to advantage at the front end of the vehicle, especially for signaling traffic officials at street intersections, and in many instances, the signal may be installed on both the front and rear ends of the vehicle.

In Fig. 6, I have shown a signal mechanism in outline at the front end of the vehicle, as well as at the rear, the front signal being designated 10$^b$. This signal may be a duplicate of that which is provided at the rear end of the vehicle. In case the vehicle is provided both at the front and rear with signaling mechanisms, both signals may be operated simultaneously by the same switching mechanism shown diagrammatically in Fig. 9. I do not consider it necessary to show a diagram for both signals, for it will be readily understood that the corresponding magnets of the two signals may be electrically connected to the common switching mechanism, and common source of current so as to be operated in parallel.

It will thus be seen that I have provided means for effectively signaling or giving warning of the fact that the vehicle is to either stop or to turn to the right or to the left; and I have also provided means under the control of the operator, whereby the signal may be operated prior to the time the vehicle is either turned or slowed down, and additionally have provided means for automatically causing the actuation of the signal to indicate that the vehicle is to be turned, stopped or slowed down, in case the signal mechanism is not actuated manually.

I have illustrated my invention applied to a motor vehicle, but it will be understood that it may be employed on other types of vehicles or conveyances. For example, it may be advantageously employed on power boats for precisely the same purpose that it is employed on a motor vehicle, and it might be employed also on a steamboat as a signal from the bridge to the engine room. In some instances, my invention, with slight modifications, may be used to advantage for certain purposes which do not require its installation on moving vehicles. However, in those claims wherein the signal mechanism is defined in association with a vehicle, the word "vehicle" is used in its broad sense, and not in a limited sense as indicating any particular form of vehicle or conveyance.

Having thus described my invention, what I claim is:

1. The combination with a vehicle, signaling mechanism for indicating the stopping or turning of the vehicle to the right or left, said signaling mechanism including an arm adapted to be turned on its longitudinal axis and to be swung from upright position to the right or to the left, and separate devices for turning the arm about its longitudinal axis and for swinging the arm from upright position.

2. In combination with a vehicle, signaling mechanism carried thereby for indicating the stopping or turning of the vehicle to the right or left, said signaling mechanism including an arm adapted to be turned on its longitudinal and axis to be swung from upright position to the right or to the left, and means for turning the arm about its longitudinal axis while the arm is in upright position and for swinging the arm in either direction from upright position.

3. In combination with a vehicle, signaling mechanism carried thereby for indicating the stopping or turning of the vehicle to the right or left, said signaling mechanism including an arm adapted to be turned on its longitudinal axis and to be swung from upright position to the right or to the left, means for turning the arm about its longitudinal axis while the arm is in upright position, and for swinging the arm from upright position either to the right or to the left, said means including a plurality of magnets, a source of current, and switching devices under the control of the operator for energizing the magnets.

4. A signaling mechanism including an arm adapted to be turned on its longitudinal axis, and to be swung from normal position to the right or to the left, and means for giving to said arm a turning movement about its longitudinal axis only, or for giving to said arm both a swinging movement to the right or left, and said turning movement.

5. In combination in a signaling mechanism, a movable arm, a magnet for turning said arm about its longitudinal axis, a pair of magnets for swinging said arm from normal position to the right and to the left respectively, and switching means for controlling the energization of said magnets.

6. In combination in a signaling mechanism, a movable arm, a magnet for turning said arm about its longitudinal axis, a pair of magnets for swinging said arm from normal position to the right and to the left respectively, and switching means for causing the energization of the magnet for turning the arm so that the arm will be given the one movement only, or for causing the energization of said magnet for turning the arm and one of the magnets for swinging the arm so that the arm will be given the two movements.

7. In combination in a signaling mechanism, an arm normally supported in upright position, magnets for swinging said arm to the right or to the left from said upright position, magnets for temporarily holding said arm against movement after being swung to the right or to the left, and switching devices under the control of the operator for causing the energization of either of said swinging magnets, and simultaneously one of the holding magnets.

8. In combination in a signaling mechanism, an arm normally supported in upright position, locking mechanism for holding the arm in upright position, a releasing magnet for unlocking said arm, magnets for turning the arm either to the right or to the left from upright position, holding magnets for temporarily holding the arm against movement after it has been swung to the right or to the left, and switching devices under the control of the operator for causing the energization of said magnets.

9. In combination with a vehicle having steering mechanism and brake mechanism, a signaling mechanism including an arm normally in upright position and adapted to be turned about its longitudinal axis and to be swung from normal position either to the right or to the left, means associated with said arm and operatively connected with said brake mechanism for causing said arm to be turned about its longitudinal axis when the brakes are set, and means associated with said arm and operatively connected with the steering mechanism for turning said arm to the right or to the left when the vehicle is turned by the steering mechanism to the right or to the left respectively.

10. The combination with a vehicle having brake and steering mechanisms, a signaling mechanism including a movable arm, a magnet for turning the arm about its longitudinal axis, additional magnets for swinging the arm from its normal position to the right or to the left, switching devices associated with the brake mechanism for causing the energization of the magnet for turning the arm about its longitudinal axis, and switching devices associated with the steering mechanism for causing the energization of the magnet for turning the arm about its longitudinal axis and also one of the magnets for swinging the arm from normal position.

11. In combination with a vehicle, a signaling mechanism comprising an arm mounted for turning movement about its longitudinal axis and for swinging movement from normal position to the right or to the left, a signaling lamp carried by said arm, means for swinging said arm to the right or to the left of its normal position, means separate from said swinging means for turning the arm about its longitudinal axis, a source of current and switching devices for causing the lighting of said lamp when the arm is swung from normal position or turned about its axis.

In testimony whereof, I hereunto affix my signature in the presence of two witnesses.

HENRY C. CRUMRINE.

Witnesses:
A. F. KWIS,
A. J. HUDSON.